UNITED STATES PATENT OFFICE.

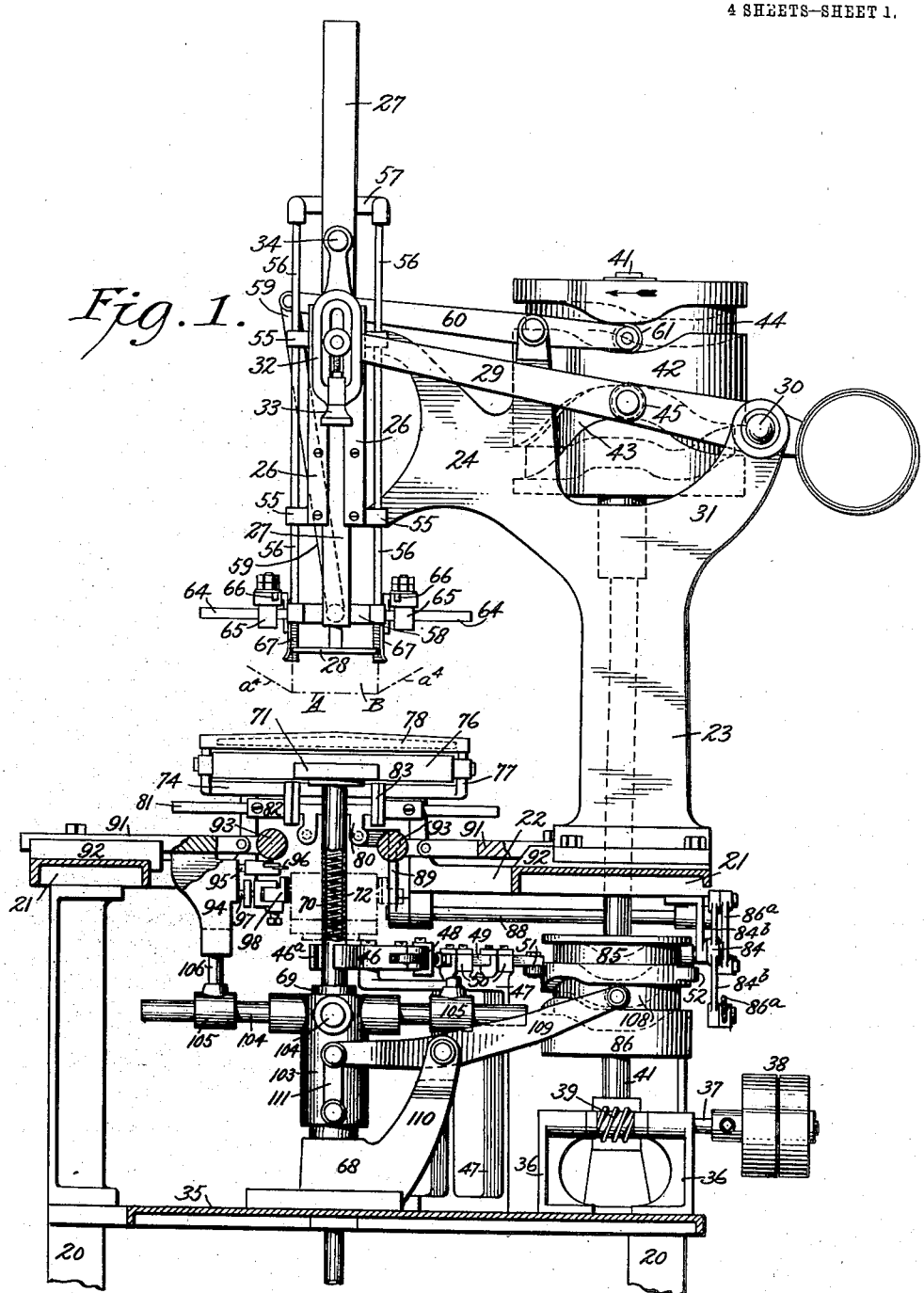

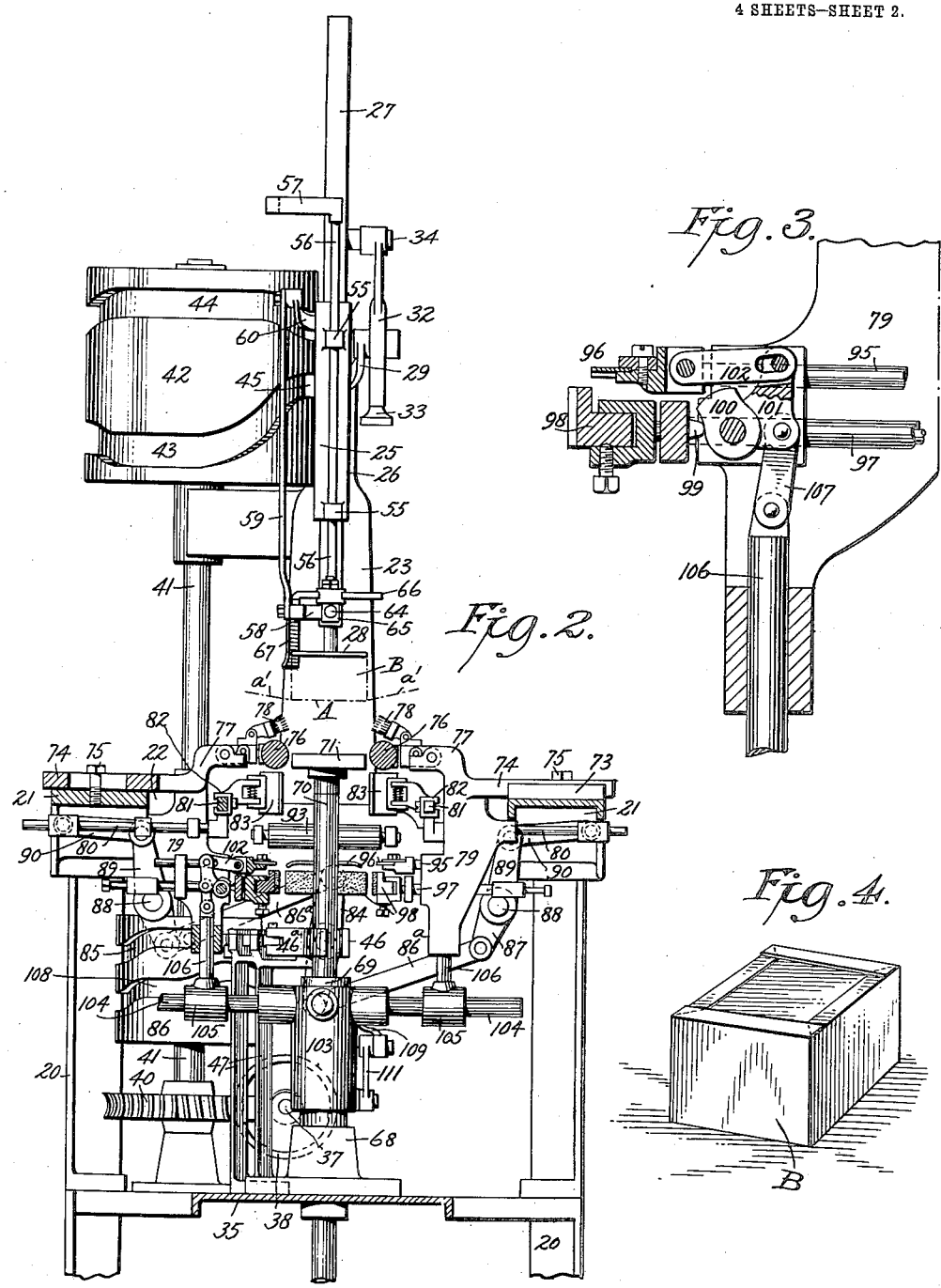

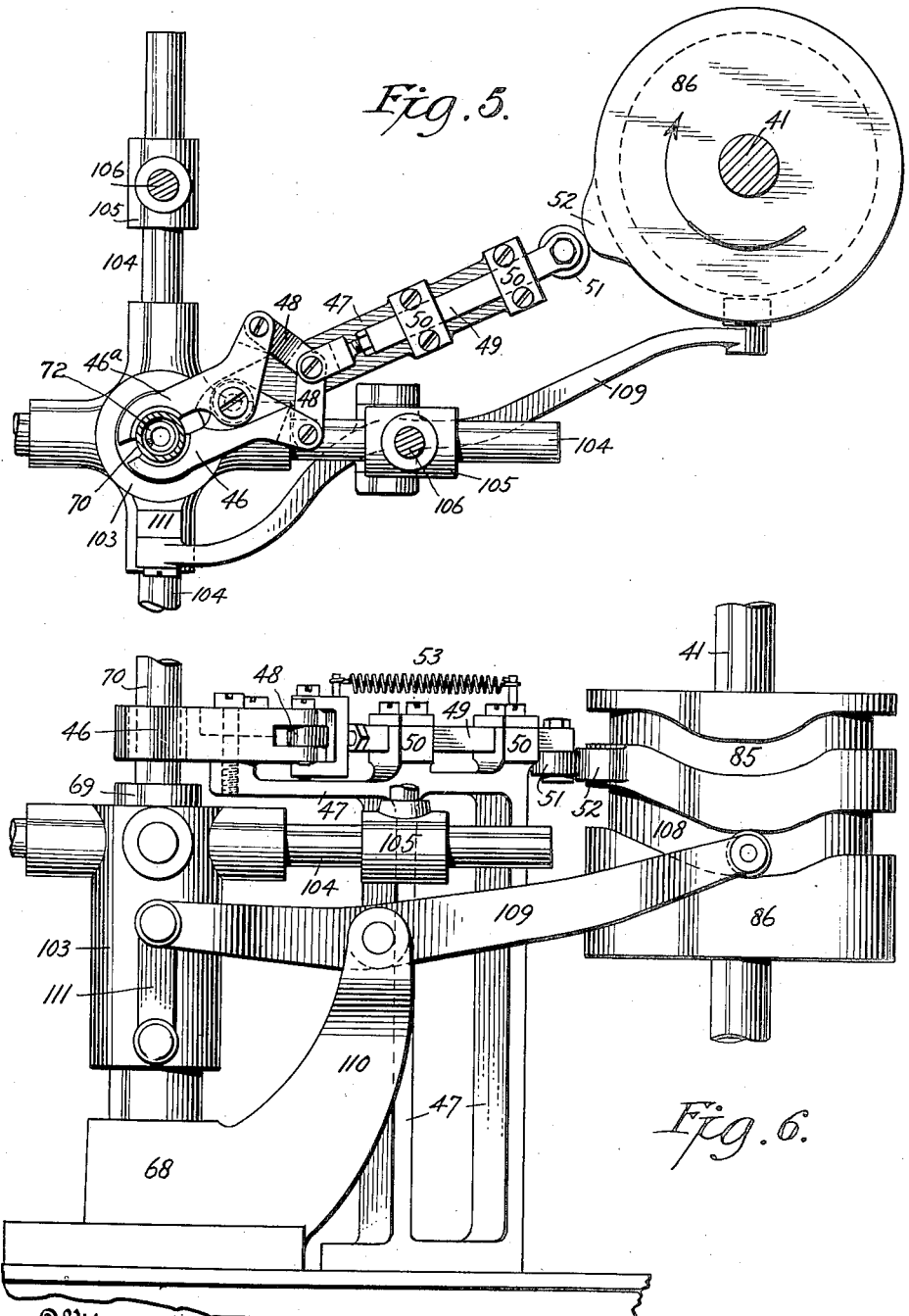

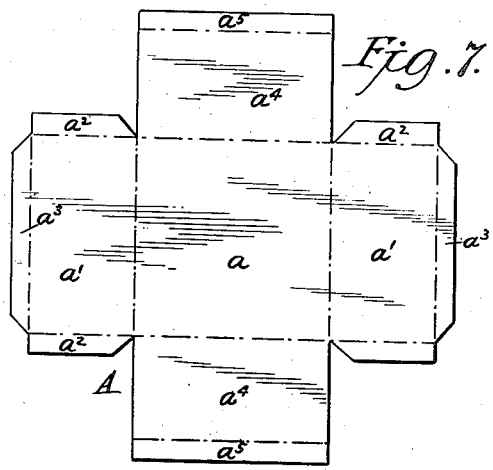
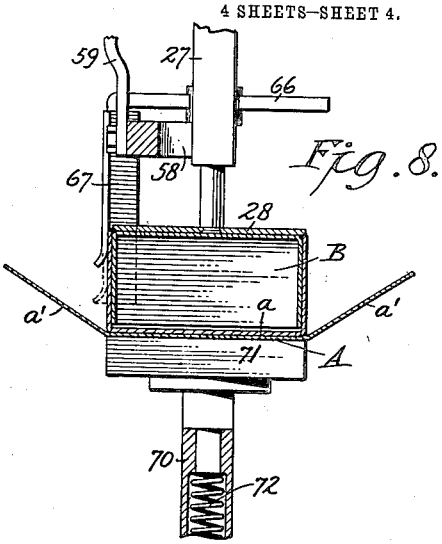
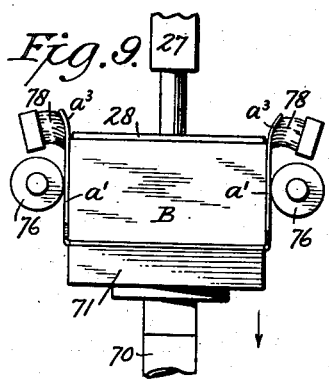
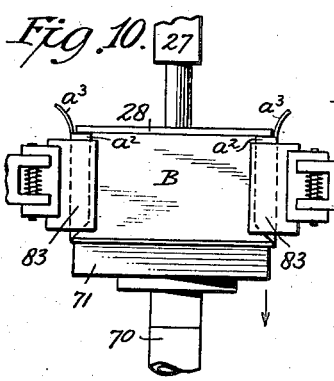
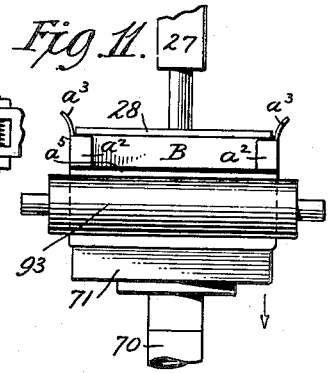
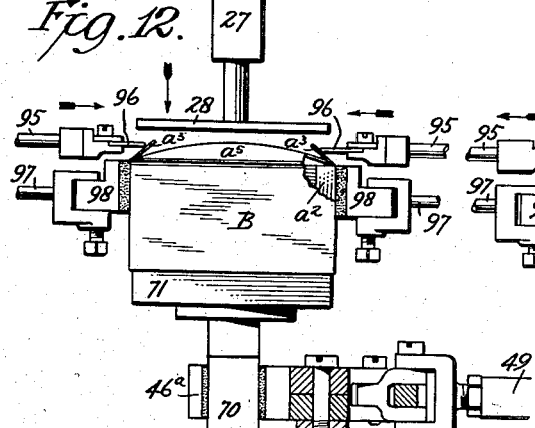
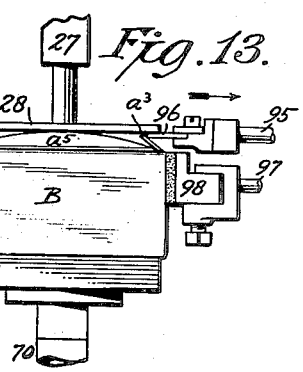

HENRY G. SCHWERDTLE, OF PHILADELPHIA, PENNSYLVANIA, ASSIGNOR TO STOKES & SMITH COMPANY, OF PHILADELPHIA, PENNSYLVANIA, A CORPORATION OF PENNSYLVANIA.

MACHINE FOR FORMING SEALED WRAPPED PACKAGES.

1,131,741.   Specification of Letters Patent.   Patented Mar. 16, 1915.

Application filed November 5, 1913. Serial No. 799,302.

*To all whom it may concern:*

Be it known that I, HENRY G. SCHWERDTLE, a citizen of the United States, residing at Philadelphia, in the State of Pennsylvania, have invented new and useful Improvements in Machines for Forming Sealed Wrapped Packages, of which the following is a specification.

This invention relates to machines for applying wrappers to packages for the purpose of forming what are known as "sealed wrapped packages", and is an improvement on that type of box covering machines set forth in Letters Patent granted to Philip S. Smith No. 691,329, dated January 14, 1902, and No. 778,805, dated December 27, 1904, and is an adaptation of machines of this class for the special purpose set forth, and is also an improvement on a machine for forming sealed wrapped packages application Serial No. 782,328 filed by James D. Reifsnyder and George H. Fath July 31, 1913.

The object of this invention is to provide a machine for folding and sealing a wrapper around packaged materials especially such materials as are packed in boxes.

The package and the cover coated with an adhesive and applied to one wall of the package are fed into the machine and, passing therethrough, the wrapper is first folded and sealed against the four vertical sides of the package, after which the projecting upstanding ends of said wrapper are turned over and secured to the remaining side of the package, which in the case of a box is preferably the bottom, said turned over ends sealing the cover to the box and closing the space between the cover and box against entrance of foreign matter. The ends of the wrapper secured to the bottom of the box do not cover the entire bottom, but extend thereover only sufficiently far to secure a tight seal.

With these and other objects in view the invention consists of a novel combination and arrangement of parts hereinafter described and illustrated in the accompanying drawings, in which—

Figure 1 is an end elevation partly in section as seen from the right of Fig. 2. Fig. 2 is an end elevation partly in section as seen from the left of Fig. 1. Fig. 3 is a detail sectional view of a portion of the wrapper folding mechanism. Fig. 4 is a perspective view of a sealed wrapped package. Fig. 5 is a plan view of the automatically operated clamp for holding the platen depressed. Fig. 6 is an elevation of the same. Fig. 7 is a plan view of the wrapper blank. Figs. 8 to 13 are detail views of portions of the wrapper mechanism showing by progressive stages the manner in which a wrapper is folded and secured about a package.

Similar reference characters are used throughout all the figures to indicate like parts.

Referring first to Fig. 7, A is the wrapper, as a whole, made substantially of the form shown, on the central part $a$ of which the package is placed after the upper surface of the wrapper has been completely covered with an adhesive. $a'$, $a^4$ are flaps projecting from opposite sides of the part $a$, of which the flaps $a'$ are turned up by the first folding operation against corresponding sides of the package in which position side laps $a^2$ thereon will project beyond the other sides of the package and end laps $a^3$ above the upper surface of the same. The side laps $a^2$ are next folded around the corners of the package against the sides thereof, after which the flaps $a^4$ are folded aganist said sides and cover the end laps $a^2$. From the flaps $a^4$ end laps $a^5$ project upwardly above the package, and in connection with the end laps $a^3$, are folded over the upper side of said package to complete the wrapping and sealing thereof.

Mounted upon legs 20 which rise from the floor is a table 21, having an opening 22 in its center, through which projects the wrapper folding mechanism, and also through which the package and the wrapper therefor are carried during the course of the wrapping operation. Rising from the top of the table at the right side thereof is a vertical standard 23 from which an arm or bracket 24 projects toward the center line of the machine. Secured to said arm or bracket is an upright plate 25 provided on its front with two vertical guides 26 between which is mounted a slide 27, on the lower end of which is fixed a pusher block or plunger 28 movable in a vertical line through the opening 22 in the table 21 by means of a counterbalanced lever 29 fulcrumed at 30 on an arm 31 projecting out from the standard 23. The free end of the lever 29 is pivoted to a link 32, adjustable in said link by a thumb screw 33. A pin 34 pivotally connects the upper end of the link to the slide 27. The vibration of the lever 29 on its fulcrum 30 reciprocates the slide 27 in its guides thereby raising and lowering the pusher block or plunger 28.

A short distance below the table 21 is a plate 35 secured to the legs 20. Bolted to this plate are bearings 36 in which revolves a shaft 37, driven by a belt pulley 38 or other means, carrying a worm 39 fixed thereon. In rear of the worm 39 and driven thereby is a worm wheel 40 keyed on the lower end of an upright shaft 41 stepped in a bearing supported on the plate 35, said shaft extending vertically behind the standard 23 and above the same and turning in suitable bearings on the standard. On the upper end of the shaft 41 is a drum 42 in the periphery of which are two cam grooves 43, 44, that extend entirely around said drum, the lower cam 43 actuating the lever 29 by means of a stud or roller 45 carried by said lever. Rotation of the cam-drum in the direction indicated by the arrow will cause the lever 29 to swing downwardly and move the slide 27 and the pusher block or plunger thereon through the table 21. The plunger will pause momentarily and then be carried to its lowest position, after an instant's stop it will be raised slightly, then lowered and finally raised to its highest position ready to act on another package. The object of these various movements of the plunger will be set forth later.

Slidable vertically in ears 55 projecting laterally from the right and left sides of the plate 25 are rods 56 connected at their upper ends by a plate 57 which extends behind the slide 27 above the top of the plate 25. The lower ends of the rods 56 are secured in the end of a U-shaped frame or bar 58 that curves rearwardly behind the sliding stem 27 in order to clear the same, said frame or bar being connected by means of a link 59 to one end of a lever 60 pivotally mounted on the arm or bracket 24 intermediate its ends and having at its opposite end a pin or roller 61 extending into the upper cam groove 44 on the drum 42. The lever 60 is rocked in a vertical direction when the cam drum 42 rotates, and through the link 59 raises and lowers the frame or bar 58.

Fixed in the ends of the U-shaped frame or bar 58 and projecting to the right and left thereof in a horizontal direction and preferably in line, are two arms 64 upon each of which is adjustably mounted a collar 65 which may be moved longitudinally on said arm. Each collar 65 supports a finger 66, adjustable in a direction at right angles to the axis of the arms 64. On each finger at its rear end is a downwardly projecting angle shaped gage plate 67, which in the normal position of the parts shown in Fig. 1, projects below the under surfaces of the plunger 28. These gage plates lie close to the rear corners of the pusher block or plunger 28, and serve as a guide to position the box or package that is to be wrapped, relatively to the plunger, when inserted in the machine.

Secured to the plate 35 which sustains the bearings for the worm shaft 37 is a support 68 in a vertical line below center of the plunger or pusher block 28. A hollow bearing 69 projects upwardly from the support 68 in which bearing is mounted to slide in a vertical direction, a hollow stem 70 on the upper end of which is secured a platen 71 that serves as a support for the wrapper and the article to be wrapped during its passage through the wrapping mechanism. The platen is held above the plane of the table 21 by yielding pressure, in the present instance a spiral spring 72 within the hollow stem 70 serves the purpose. When the plunger 28 and the frame 58 with the gage plates or fingers 67 descend with the wrapper and the article to be wrapped, said article and wrapper engage the platen, and are held by and between said platen and the plunger during their progress through the folding mechanism, the spring 72 returning the platen and the wrapped package to initial position after the wrapping operation has been completed.

When the platen 71 is forced by the downward movement of the plunger 28 into its lowest position, the platen would rise during the short retreat of the plunger were not means provided to retain it in such lowered position. The means here shown is one of many that may be employed and has proven very satisfactory in the practical operation of the machine, a different means may, however, be applied if desired, or found more suitable under changed conditions.

The platen holding means or clamp here used and illustrated in detail in Figs. 5 and 6 comprises two gripping jaws 46, 46ª, pivotally connected together and mounted on a bracket 47 secured to the plate 35 to swing in a horizontal direction, said jaws having opposing concave depressions in their ends through which the stem 70 of the platen 71 travels, and which clamp said stem when the platen is to be held immovable. The opposite ends of the jaws have each an outwardly inclined tail, said tails being pivotally connected by toggle links 48 to one end of a horizontal slide 49, movable longitudinally in bearings 50 projecting up from the top of the bracket 47. The opposite end of the slide carries a roller 51, which at the proper time in the rotation of the vertical shaft 41, is engaged by a projecting cam 52 on the drum 86 to push the slide 49 toward the stem 70, thus spreading the toggle 48 and causing the jaws 46, 46ᵃ to grip the stem 70. After the cam 52 has passed the roller 51, the slide 49 is returned and the jaws opened by a spring 53, connected at one end to the slide and at the other end to a bearing 50.

The folding mechanism employed in this machine is in the main, substantially the same as that shown in the hereinbefore mentioned patents granted to Philip S. Smith, and the co-pending application filed by Reifsnyder and Fath, and, therefore, will be referred to here only in general terms.

On the top of the table 21 at the front and rear thereof, are guides 73 in which are held plates or slides 74 adjustable to and from the center of the opening 22 in the table, said plates being held in adjusted position by set screws 75. The inner end of each plate 74 supports a roller 76, the ends of which are mounted in bearings on the ends of arms 77 projecting upwardly from plates 74. Also mounted on each arm 77 is a brush 78 above the roller 76 and substantially as long as said roller. Depending from each plate 74 below the arm 77 is a bracket 79 provided with bearings which support a sliding frame 80, the inner end of which frame has fixed thereon a bar 81 extending at right angles to the line of movement of said frame. On each bar 81 are two sleeves 82 on each of which is mounted a yielding side lap tuck-in finger 63. Each frame 80 with its two tuck-in fingers 83 is moved toward and away from the center of the machine by means of a three-armed lever 84 pivoted on a bracket depending from the under side of the table 21 at its rear, and actuated by a cam groove 85 in a drum 86 fixed on the vertical shaft 41 that carries the drum 42. One of the arms is provided with a pin or roller engaging the cam groove 85, the other arms 84ᵇ are connected by links 86ᵃ with downwardly projecting arms 87 on cross shafts 88 one at the front and the other at the rear of the machine. An upwardly extending arm 89 on each shaft is connected by a link 90 one to the frame 80 at the front of the machine, and the other to the like frame at the rear of the machine. When the three-armed lever 84 is rocked, the frames 80 move simultaneously to and from the center of the machine, and movable with each frame are the two side lap tuck-in fingers 83 mounted thereon.

On the right and left sides of the table 21 are plates 91 mounted in guides 92 in a manner similar to the plates 74, and carrying at their inner ends rollers 93, in a plane below the rollers 76 and at right angles to said rollers. Depending from the inner ends of the plates 91 are brackets 94 similar to the brackets 79 but shorter. In each bracket 79 and 94 is mounted a horizontal sliding frame 95 to the inner end of which is fixed horizontal end-tuck-in fingers 96, the four fingers lying in the same horizontal plane. Just below each frame 95 is a second horizontal sliding frame 97 each supporting on its inner end a presser block 98 from the exterior side of which projects a lug 99. Mounted to rock in each bracket 79, 94 adjacent the lug 99 is a rocking cam 100 to which is fixed a short arm 101 by means of which said cam is actuated to advance the frame 97 with the presser blocks 98, and through the medium of a link 102 pivoted to said arm and to the adjacent horizontal sliding frame 95, the end-tuck-in finger 96 connected to said sliding frame is advanced and retracted. Movement is imparted to all the arms 101 to simultaneously advance the presser blocks 98 and the end-tuck-in fingers 96 by means of a sleeve 103 movable vertically on the bearing 69, said sleeve having four radially projecting arms 104 extending horizontally beneath the brackets 79, 94. On each arm is an adjustable collar 105, from the top of which projects a pin 106 slidable through the bottom of the superjacent bracket. The upper end of each of said pins 106 is connected by a link 107 with one of the short arms 101. Movement is imparted to the sleeve 103 by a cam groove 108 in the drum 86 actuating one end of a rocking lever 109 pivoted intermediate its ends upon an arm 110 extending from the bearing support 68, the other end of said lever being connected by a link 111 with the sleeve 103.

In the operation of the machine, the worm 39 is rotated continuously and through its connection to the worm wheel 40 imparts continuous rotation to the vertical shaft 41 and the cam drums 42 and 86 thereon. At each rotation of the drums, when they arrive at the position shown in Fig. 1, a package B, which in the present instance is a box made of paper board filled with merchandise, and closed with a cover that projects over the box and extends to the bottom thereof. This box with its bottom uppermost and a blank A adhering to the top of the cover is placed by an attendant against the under side of the plunger 28, and against the gage plates 67, which latter exactly position the box relatively to the plunger. As thus placed the flaps $a^1$, $a^4$, of the wrapper project laterally from the box as shown in Figs. 1, 2 and 8. Rotation of the cam drum 42 now causes the levers 29 and 60 to swing downwardly, simultaneously depressing the plunger and the gage fingers, the latter maintaining the box in position against said plunger during its passage to the platen 71. As soon as the box and the wrapper have reached, or nearly reached the platen, the gage fingers 67 will pause, the plunger however continues its downward movement and presses the box and wrapper against the platen to hold them securely in position against movement during their passage through the wrapping mechanism. The approach of a box and its wrapper to the platen bring the two flaps $a^1$ of the wrapper into contact with the brushes 78, which turn up said flaps against corresponding sides of the box. The plunger, box, wrapper, and platen now move downwardly together, the flaps $a^1$ previously turned up by the brushes are by the rollers 93, pressed against the sides of said box into close contact therewith to cause the adhesion of said flaps, see Fig. 9. As soon as the box and wrapper have passed below the rollers 76 the downward movement is arrested momentarily, during which pause the sliding frames 80 are moved inwardly with their tuck-in fingers 83 to fold the side laps $a^2$ against the uncovered sides of the box, as in Fig. 10. Upon withdrawal of the frames 80, the downward movement of the box continues. The two flaps $a^4$ now encounter the rollers 93, by means of which said flaps are turned up against the remaining vertical sides of the box and over the turned-in side laps $a^2$, see Fig. 11. Passing the rollers 93 the plunger, partly wrapper box and platen now reach their lowest position, see dotted lines Fig. 1, whereupon the cam lug 52 moves the slide 49 and causes the jaws 46, 46$^a$ to grip the stem 70 and hold the platen immovable in its lowest position while the plunger retreats a short distance to permit the end laps $a^3$, $a^5$, to be folded over the bottom of the box. During the time the platen is held by the jaws and the plunger raised from the box, the presser blocks 90 are moved to bear on the vertical sides or walls of the box, and the tuck-in fingers 96 simultaneously fold the laps $a^3$, $a^5$, of the wrapper over the bottom of said box. The fingers 96 which fold the laps $a^5$ move before the fingers which turn the laps $a^3$, the earlier movement being due to the fact that the connection between the short arms 101 and links 102 that actuate the latter fingers is a pin and slot connection, see Fig. 3, and, therefore, has a certain amount of lost motion. The plunger again descends to press the folded laps $a^3$, $a^5$, closely against the bottom of the box, the tuck-in fingers withdraw as do the presser blocks 90 and the jaws open to release the platen. The plunger, platen and completely wrapped box now rise above the table 21 to permit removal of the box and the insertion of another one and its wrapper.

What I claim is:—

1. In a machine for forming a sealed wrapped package, the combination with wrapper folding and affixing instrumentalities for applying an adhesively coated wrapper to all the walls of the package save one, leaving the marginal edges of said wrapper projecting above the plane of said uncovered wall, said folding instrumentalities including devices for turning the projecting marginal edges of the wrapper over the uncovered wall of the package, of a movable package supporting platen, and a coöperating plunger between which said package and its wrapper are supported and carried through said folding instrumentalities, means for causing a temporary limited retreat of said plunger to permit said projecting edges of the wrapper being turned in, and then a further downward movement of said plunger, and means for holding said platen in fixed position during the temporary retreat of said plunger.

2. In a machine for forming a sealed wrapped package, the combination with wrapper folding and affixing instrumentalities for applying an adhesively coated wrapper to all the walls of a package save one, leaving the marginal edges of said wrapper projecting above the plane of said uncovered wall, of a movable package supporting platen, and a coöperating reciprocating plunger between which said package and its wrapper are supported and carried through said folding instrumentalities, means for causing a temporary limited retreat of said plunger and then a second forward movement thereof to bring the plunger against the package, means for folding the projecting edges of the wrapper over the uncovered walls of the package, and means for holding said platen in fixed position during the temporary retreat of said plunger and until said second forward movement of said plunger secures said wrapper edges to said package.

3. In a machine for forming a sealed wrapped package, the combination with wrapper folding and affixing instrumentalities for applying an adhesively coated wrapper to all the walls of a package save one, leaving the marginal edges of said wrapper projecting above the plane of said uncovered wall, of a movable package supporting platen, and a coöperating plunger between which said package and its wrapper are supported and carried through said folding instrumentalities, means tending constantly to hold said platen in elevated position, means for causing the temporary limited retreat of said plunger, means for folding the projecting edges of the wrapper over the uncovered wall of the package, and means for holding said platen stationary against the force of the elevating means during the temporary retreat and return of said plunger.

4. In a machine for forming a sealed wrapped package, the combination with wrapper folding and affixing instrumentalities for applying an adhesively coated wrapper to all the walls of a package save one, leaving the marginal edges of said wrapper projecting above the plane of said uncovered wall, of a movable package supporting platen, and a coöperating plunger between which said package and its wrapper are supported and carried through said folding instrumentalities, means tending constantly to hold said platen in elevated position, means for causing the temporary limited retreat of said plunger from its lowest position, means for folding the projecting edges of the wrapper over the uncovered walls of the platen, and means for positively gripping said platen and holding it stationary against the force of said elevating means during the temporary retreat and return of the plunger.

5. In a machine for forming a sealed wrapped package, the combination with wrapper folding and affixing instrumentalities for applying an adhesively coated wrapper to all the walls of a package save one, leaving the marginal edges of said wrapper projecting above the plane of said uncovered wall, of a movable package supporting platen, and a coöperating plunger between which said package and its wrapper are supported and carried through said folding instrumentalities, means tending constantly to hold said platen in elevated position, means for causing the temporary limited retreat of said plunger from its lowest position, means for folding the projecting edges of the wrapper over the uncovered walls of the platen, means for positively gripping said platen and holding it stationary against the force of said elevating means during the temporary retreat and return of the plunger, and means moving in timed relation with the plunger for operating the gripping means.

6. In a machine for forming a sealed wrapped package, the combination with wrapper folding and affixing instrumentalities for applying an adhesively coated wrapper to all the walls of a package save one, leaving the marginal edges of said wrapper projecting above the plane of said uncovered wall, of a movable package supporting platen, and a coöperating plunger between which said package and its wrapper are supported and carried through said folding instrumentalities, means for causing a temporary limited retreat of said plunger, means for folding the projecting edges of the wrapper over the uncovered walls of the package, a pair of gripping jaws adapted to clamp and hold said platen stationary in its lowered position, and means operating in timed relation with the plunger for closing said gripping jaws.

7. In a machine for forming a sealed wrapped package, the combination with wrapper folding and affixing instrumentalities for applying an adhesively coated wrapper to all the walls of a package save one, leaving the marginal edges of said wrapper projecting above the plane of said uncovered wall, of a movable package supporting platen, and a coöperating plunger between which said package and its wrapper are supported and carried through said folding instrumentalities, means for causing a temporary limited retreat of said plunger, means for folding the projecting edges of the wrapper over the uncovered walls of the package, a pair of gripping jaws adapted to clamp said platen and hold it stationary in its depressed position, a continuously rotating shaft, means on said shaft for operating the plunger and the folding instrumentalities, and other means on the said shaft for operating the gripping jaws.

8. In a machine for forming a sealed wrapped package, the combination with wrapper folding and affixing instrumentalities, of a plunger, and a movable platen between which said package and a wrapper are carried through said folding instrumentalities, means for temporarily retracting said plunger, a pair of gripping jaws for holding said platen stationary in its depressed position during the retreat of the plunger, a continuously rotating shaft, means on said shaft for operating the plunger and said folding instrumentalities, and a cam on said shaft for actuating said jaws to grip the platen.

In testimony whereof I have hereunto set my hand in presence of two subscribing witnesses.

HENRY G. SCHWERDTLE.

Witnesses:
CHARLES H. NITSCH,
WALTER J. RICE.